United States Patent [19]

Le Gallais

[11] Patent Number: 4,505,460
[45] Date of Patent: Mar. 19, 1985

[54] LEAF SPRINGS OF COMPOSITE MATERIAL

[75] Inventor: Raymond Le Gallais, Birmingham, England

[73] Assignee: GKN Technology Limited, Wolverhampton, England

[21] Appl. No.: 396,786

[22] Filed: Jul. 9, 1982

[30] Foreign Application Priority Data

Jul. 15, 1981 [GB] United Kingdom ............... 8121804

[51] Int. Cl.³ .............................................. F16F 1/26
[52] U.S. Cl. ................................... 267/54 R; 267/149
[58] Field of Search ................. 267/47, 54 R, 54 B, 267/148, 149, 158

[56] References Cited

U.S. PATENT DOCUMENTS

| 1,142,817 | 6/1915 | Kirk | 267/54 R |
| 1,361,471 | 12/1920 | Kozub | 267/54 R X |
| 1,799,880 | 4/1931 | Arcand et al. | 267/54 R X |
| 2,191,528 | 2/1940 | Hewel | 267/54 R |
| 3,968,958 | 7/1976 | Huchette et al. | 267/47 |
| 4,411,159 | 10/1983 | Spear et al. | 267/47 X |

FOREIGN PATENT DOCUMENTS

| 005916 | 12/1979 | European Pat. Off. | |
| 25299 | 10/1922 | France | 267/54 R |
| 366322 | 2/1932 | United Kingdom | |
| 767504 | 2/1957 | United Kingdom | 267/54 R |

Primary Examiner—Duane A. Reger
Attorney, Agent, or Firm—Marshall, O'Toole, Gerstein, Murray & Bicknell

[57] ABSTRACT

A fibre reinforced composite leaf spring is provided at its end with an end fitting for attachment to a rigid part of a vehicle. The end fitting 11 comprises an attachment member which fits snugly within an arcuate recess defined by a terminal portion of the spring. A sheet metal clamping member surrounds and reinforces the attachment member and recess and is rivetted or otherwise fastened to the leaf spring at a position remote from its terminal portion. The terminal portion of the spring extends around the attachment member at least beyond a position at right-angles to the longitudinal axis of the spring.

7 Claims, 3 Drawing Figures

LEAF SPRINGS OF COMPOSITE MATERIAL

BACKGROUND TO THE INVENTION

Field of the Invention

This invention relates to leaf springs made of composite, fibre reinforced synthetic resin, material.

Composite leaf springs may be used, for example, in motor vehicles. By such use, considerable savings in weight can be achieved as compared with the use of conventional steel leaf springs. A composite spring may comprise glass and/or carbon fibres set within a matrix of a cured resin, for example, an epoxy resin. By the selection of suitable fibres and, in particular, the orientation of such fibres within the spring with some fibres oriented substantially longitudinally of the spring and some fibres in other orientations, a spring can be manufactured which is considerably lighter than a steel leaf spring having the same springing properties.

However, leaf springs of composite material can be relatively expensive to produce when compared with steel springs. One area of significance in this respect is at the ends of the spring where it is required to be attached to a vehicle. In the case of a steel spring, the ends of the spring can simply be scrolled to provide a transverse aperture suitable for receiving a bush and pin for mounting the spring, whereas this cannot easily be done in the case of a composite spring. It has been proposed that a composite spring can be provided with an end fitting in which the material of the spring is surrounded and reinforced by a pair of metal members which are clamped together and which secure an eye to the spring for receiving a fixing bolt or pin, but this is relatively complex and expensive.

SUMMARY OF THE INVENTION

It is an object of the present invention to provide a composite leaf spring with an effective yet economical end fitting.

According to the invention, I provide a leaf spring made from a fibre reinforced synthetic resin material and having at least one end fitting comprising an attachment member lying within a recess extending transversely of the spring and defined by a terminal portion of the spring, and a clamping member extending around the attachment member and said terminal portion of the spring and secured to the spring adjacent said terminal portion to exert a force to hold the attachment member in said recess. Said terminal portion of the spring preferably extends around the attachment member at least beyond a position at right angles to the longitudinal axis of the spring adjacent said terminal portion.

The attachment member may comprise a tubular element, which may be split so that it can engage tightly a part such as a conventional metal-rubber-metal bush received therein. The terminal portion of the spring may subtend an angle of arc of between 90° and 180° at the centre of such tubular element.

The clamping member is preferably a sheet metal member having portions which lie against respective opposed surfaces of the spring adjacent said terminal portion thereof, with securing means holding said portions of the sheet metal member to the spring. Various forms of such holding means are described hereinafter.

BRIEF DESCRIPTION OF THE DRAWINGS

The invention will now be described by way of example with reference to the accompanying drawings of which.

DESCRIPTION OF PREFERRED EMBODIMENTS

Figure 1:
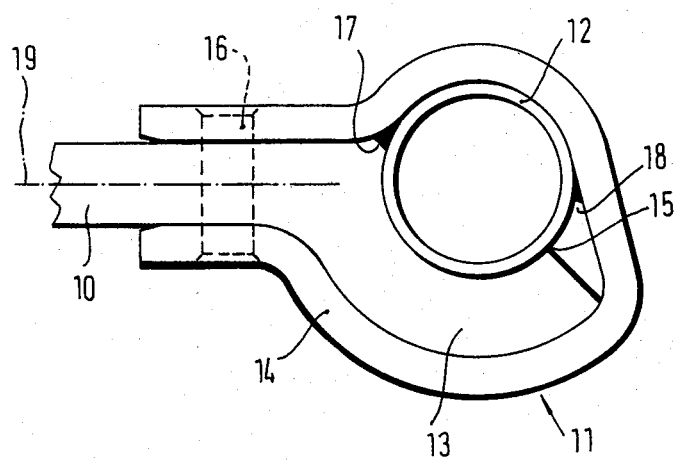
FIG. 1 is a side view of the end fitting at one end of a leaf spring according to the invention.

Referring firstly to FIG. 1, there is shown a leaf spring 10 comprising fibres set within a cured synthetic resin. By way of example, the fibres may extend substantially longitudinally of the spring adjacent the end thereof, although the spring may include regions containing fibres of different orientations. The illustrated end fitting of the spring comprises an attachment member 12 lying within a recess extending transversely of the spring and defined by a terminal portion 13 of the spring, the attachment member and terminal portion of the spring are surrounded by a clamping member 14 which holds the attachment member 12 firmly within the recess defined by the portion 13 of the spring.

The attachment member 12 is a tubular steel sleeve for receiving a pin or bolt for securing the spring to, for example, a motor vehicle. Using the sleeve 12 will receive a conventional metal-rubber-metal bush as an intermediate component, or may itself constitute the outer element of such a bush. The terminal portion 13 of the spring subtends an angle of approximately 135°, between the end 15 of the spring and the centre line 19 of the spring adjacent the terminal portion, at the centre of the tubular member 12.

The clamping member 14 is of sheet steel, and fits closely around the attachment member 12 and terminal portion of the spring, with portions lying against the upper and lower surfaces of the spring adjacent its terminal portion. These portions of the clamping member as held to the spring by a rivet extending through them and the spring as indicated at 16. Other fastening elements, e.g. a bolt, could be used instead of the rivet illustrated, and the number and disposition of such fastening elements would be selected to suit any particular application for the spring.

The tubular attachment member 12 may be secured to the clamping member 14, for example by welding as shown at 17, 18, or by some form of mechanical interfitting and/or the use of an appropriate adhesive.

In use of the spring, considerable forces in different directions will arise between the spring itself and the pin or bolt received directly or indirectly in the attachment member 12. A particular installation will be arranged such that the main force of, for example, the weight of a motor vehicle, will tend to force the attachment member 12 into the recess afforded by the terminal portion 13 of the spring, rather than tending to pull it away from the spring. In the case of forces arising longitudinally of the spring, the fact that the terminal portion of the spring extends part of the way around the attachment member ensures that at least a component of such forces is applied directly to the material of the spring, rather than being applied to the spring through the clamping member 14 and rivet or other fastening elements 16. Even though the terminal portion of the spring subtends only about 135° of arc at the centre of the tubular element 12, this reduces appreciably the magnitude of forces which must be transmitted to the spring by the clamping member 14 and its fastening elements.

Figure 2:
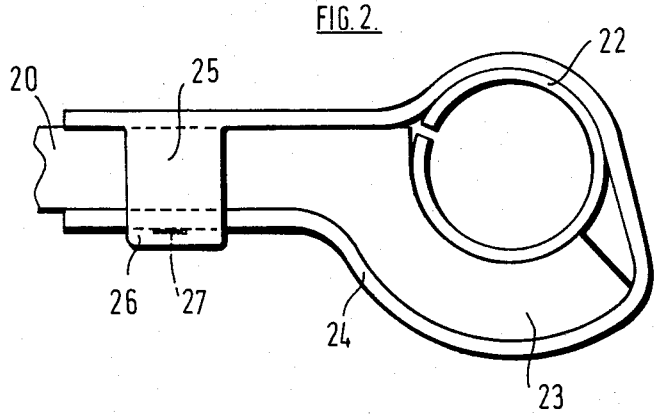
FIG. 2 is a view of a further embodiment of the invention.

Referring now to FIG. 2 of the drawings, this shows a spring 20 having a terminal portion 23. As for the embodiment of FIG. 1, the terminal portion 23 defines a transverse recess which receives an attachment member 22 which in this case is a split sleeve rather than a continuous tubular element. The member 22 is again held to the spring by a clamping member 24 of sheet metal, but in this case the clamping member has adjacent one of its end integral ears 25 which are folded downwardly and inwardly to overlap the other end portion of the clamping member at 26. The overlapping parts are spot welded together at 27. In this embodiment, it is not necessary to provide one or more holes in the spring to receive fastening elements extending therethrough. Further, since the member 22 is split, it can more effectively clamp a bush received therein.

Figure 3:
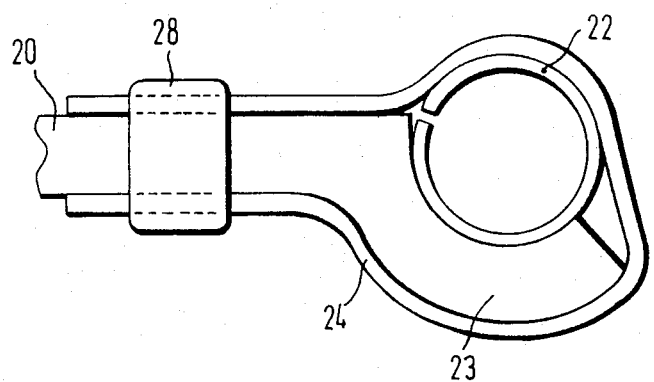
FIG. 3 shows a strap extending around the spring and end fitting.

In possible modifications of the embodiments illustrated, instead of ears 25 being formed integrally with the clamping member 24, separate sheet metal parts could be used, welded, e.g. spot welded, to the clamping member. Alternatively a strap extending completely around the clamping member and the spring adjacent its terminal portion could be used, such strap being suitably tensioned and secured in place. This is shown in FIG. 3, with a transversely extending strap element indicated at 28.

If a further bush is to be received in the attachment member 12, 22, there may be provided some means of securing these components together against the bush moving end-wise out of the attachment member. For example, an adhesive of suitable type could by employed, or some form of mechanical interlock, e.g. by way of interfitting projections and recesses in the respective component.

I claim:

1. A leaf spring made of composite, fibre reinforced resin material and including at least one end fitting comprising:

a terminal portion of the spring shaped to define an open recess extending transversely of the spring;

a tubular attachment member lying within said recess, said attachment member affording a transverse aperture and having an external surface contacting said terminal portion of said spring over an arcuate contact area subtending at least a right angle at the centre of the attachment member;

a clamping member, in the form of a unitary element of strip material, embracing said attachment member and terminal portion of the spring and having portions lying against respective opposed surfaces of the spring adjacent said terminal portions thereof; and securing means holding said portions of said clamping member together and to the spring, said securing means comprising an element extending transversely around the spring and said portions of the clamping member.

2. A leaf spring according to claim 1 wherein said clamping member is of sheet metal.

3. A leaf spring according to claim 1 wherein said contact area subtends at least approximately 135° at the centre of the attachment member.

4. A leaf spring according to claim 1 wherein said attachment member is secured to said clamping element.

5. A leaf spring according to claim 1 in which the terminal portion of the spring shaped to define an open recess extending transversely of the spring comprises an integral portion which arcs downwardly and outwardly from the spring adjacent top surface thereby providing the open recess as a concave recess when the spring is viewed from the top.

6. A leaf spring according to claim 5 in which the arced portion ends lower than the top of the spring adjacent the arced portion.

7. A leaf spring made of composite, fibre reinforced resin material and including at least one end fitting comprising:

a terminal portion of the spring shaped to define an open recess extending transversely of the spring;

a tubular attachment member lying within said recess, said attachment member affording a transverse aperture and having an external surface contacting said terminal portion of said spring over an arcuate contact area subtending at least a right angle at the centre of the attachment member;

a clamping member embracing said attachment member and terminal portion of the spring and having portions lying against respective opposed surfaces of the spring adjacent said terminal portion thereof; and securing means holding said portions of said clamping member together and to the spring, said securing means comprising a strap extending around the spring and said portions of the clamping member.

* * * * *